(12) United States Patent
Rodi et al.

(10) Patent No.: US 7,219,199 B1
(45) Date of Patent: May 15, 2007

(54) SYSTEM AND METHOD FOR INCREASING BANDWIDTH IN A DIRECTORY BASED HIGH SPEED MEMORY SYSTEM

(75) Inventors: Eugene A. Rodi, Minneopolis, MN (US); Aaron C. Peterson, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 452 days.

(21) Appl. No.: 10/769,012

(22) Filed: Jan. 30, 2004

(51) Int. Cl.
*G06F 12/00* (2006.01)
(52) U.S. Cl. ...................................... 711/155; 711/141
(58) Field of Classification Search ................ 711/155, 711/141, 118, 148, 147, 153, 144, 156, 157
See application file for complete search history.

(56) References Cited

U.S. PATENT DOCUMENTS 6,415,364 B1 *   7/2002   Bauman et al. ............. 711/155
6,546,465 B1 *   4/2003   Bertone ....................... 711/144
6,853,643 B1 *   2/2005   Hann et al. .................. 370/413

\* cited by examiner

*Primary Examiner*—Kimberly McLean-Mayo
(74) *Attorney, Agent, or Firm*—Beth L. McMahon; Charles A. Johnson; Richard J. Gregson

(57) ABSTRACT

A system and method for increasing the throughput of a directory-based storage system is provided. The storage system includes a data storage system to store data signals, and a directory to store state information for the data signals. Requests issued to the storage system are grouped into sets. The requests within a same set are issued in succession to the data storage system to initiate read and/or write memory operations. At the same time, directory entries are read from the directory for each request in the set. Each directory entry is updated as it is retrieved to reflect the requested memory operation. After all directory entries are retrieved, the updated entries are stored back to the directory in succession so that the bi-directional interface to the directory undergoes only a single direction change during the processing of the set.

35 Claims, 10 Drawing Sheets

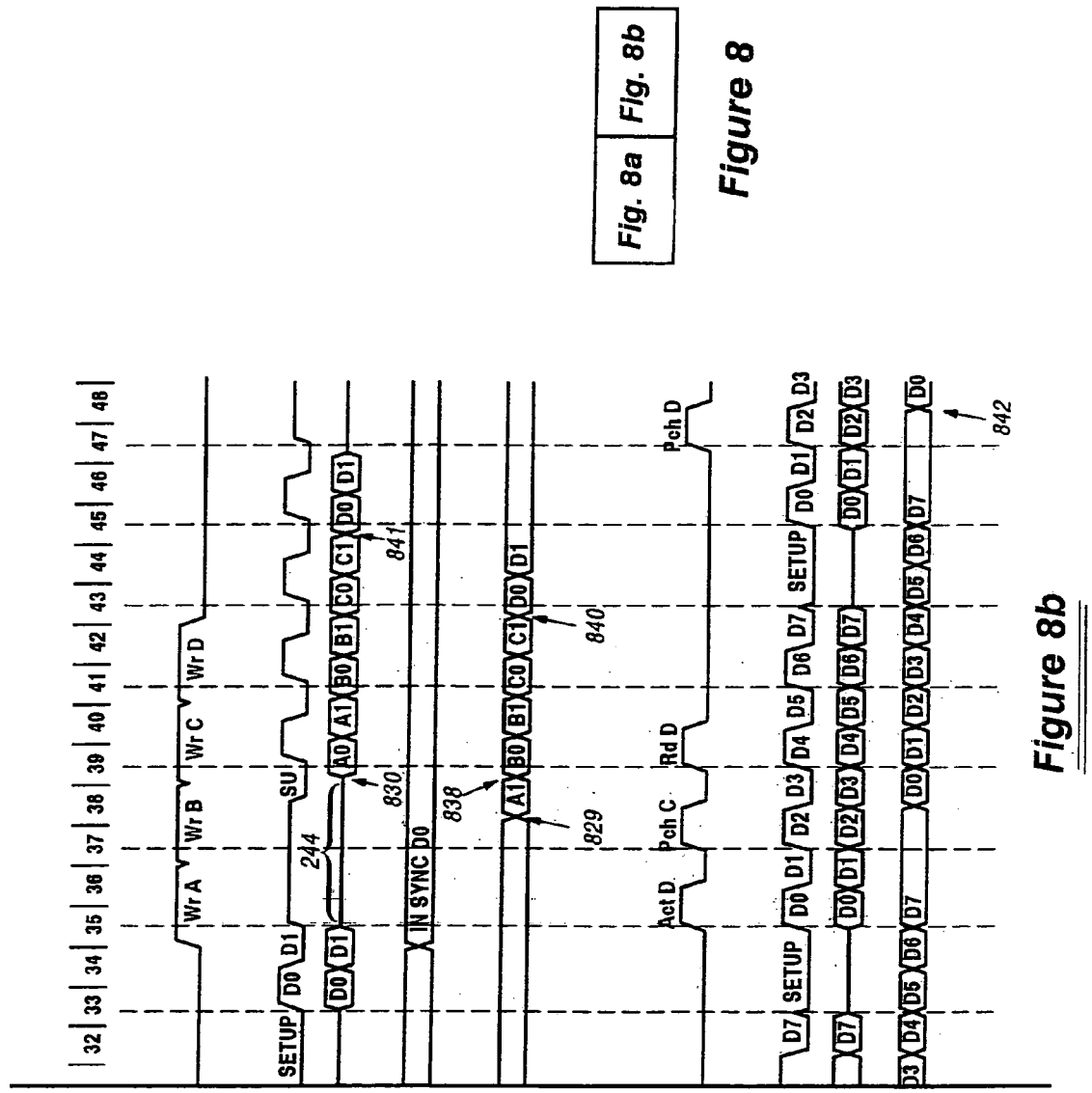

SYSTEM AND METHOD FOR INCREASING BANDWIDTH IN A DIRECTORY BASED HIGH SPEED MEMORY SYSTEM

FIELD OF THE INVENTION

This invention relates generally to memory units within a large scale symmetrical multiprocessor system, and, more specifically, to a high-performance memory having integrated directory and data subsystems.

DESCRIPTION OF THE PRIOR ART

Data processing systems are becoming increasing complex. Some systems, such as symmetric Multi-Processor (SMP) computer systems, couple two or more processors to shared memory. This allows multiple processors to operate simultaneously on the same task, and also allows multiple tasks to be performed at the same time to increase system throughput.

Although multi-processor systems with a shared main memory may allow for increased throughput, substantial design challenges must be overcome before the increased parallel processing capabilities may be leveraged. For example, the various processors in the system must be able to access memory in a timely fashion. Otherwise, the memory becomes a bottle neck, and the processors may spend large amounts of time idle while waiting for memory requests to be processed. This problem becomes greater as the number of processors sharing the same memory increases.

One common method of solving this problem involves providing one or more high-speed cache memories that are more closely-coupled to the processors than is the main memory. However, according to this architecture, some system must be utilized to ensure that all processors are working from the same (most recent) copy of the data. For example, if a copy of a data item is stored, and subsequently modified, in a cache memory, another processor requesting access to the same data item must be prevented from using the older copy of the data item stored either in main memory or the requesting processor's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data exists within a local cache, other processors are prohibited from obtaining a copy of the data from main memory until the updated copy is returned to main memory, thereby releasing the lock. For complex systems, the additional hardware and/or operating time required for setting and releasing the locks within main memory imposes too much overhead on throughput to be practical. Furthermore, reliance on such locks directly precludes use of certain types of applications such as parallel processing applications.

Another method of maintaining cache coherency is shown in U.S. Pat. No. 5,423,016 to Tsuchiya, assigned to the assignee of this invention. The method described in this patent involves providing a memory structure utilizing a "duplicate tag" with each cache memory. The duplicate tags record which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time requited to route the invalidation requests poses an undue overhead burden.

For distributed systems having hierarchical memory structures, a directory-based coherency system has been found to have advantages. Directory-based coherency systems utilize a centralized directory to record the location and the status of data as it is copied from main memory into various caches throughout the system. For example, the directory records which caches have a copy of the data, and further records if any of the caches have an updated copy of the data. When a processor makes a request to main memory for data, the central directory is consulted to determine where the most recent copy of that data resides so that it may be returned to the requesting processor and the older copy may be marked invalid. The central directory is then updated to reflect the new status for that unit of memory. A novel system and method for performing a directory-based coherency protocol in a Symmetrical Multi-Processor (SMP) system is described in U.S. Pat. No. 6,438,659 entitled "A Directory-Based Cache Coherency, System" issued Aug. 20, 2002.

Implementing high-speed memory systems that are capable of supporting a directory-based coherency protocol is problematic for several reasons. In general, accessing the central directory involves a read-modify-write operation. That is, generally, directory information is read from the directory, modified to reflect the fact that new status associated with the data item is being delivered to the requesting processor, and is written back to the directory. This read-modify-write operation cannot be completed as fast as the (single) associated data access to memory. Thus, another data access may not be initiated until the associated read-modify-write operation is complete and memory throughput is therefore diminished.

One approach for making this longer directory latency transparent to the overall system operation employs a central directory using faster hardware technology. For example, the memory array used to implement the central directory was implemented using faster Static Random Access Memory (SRAM) devices, whereas the memory array used to implement the data storage was designed using slower, but more dense, Dynamic Random Access Memory (DRAM) devices. This creates practical problems. Because SRAM devices are not as dense as DRAMs, a disproportionally large amount of circuit board area is consumed to implement the directory storage. Moreover, SRAMs and DRAMs have different power and other electrical considerations, adding to the complexity associated with designing, placing, and routing an operational printed circuit card. Additionally, two types of RAM devices must be stocked, then handled during the board-build process making fabrication of the printed circuit card a more difficult and expensive process. Implementing both the directory and data memory arrays using the same logic is practically much more desirable, but would result in a decrease in overall system throughput.

Another method of making the longer directory access times transparent is described in commonly assigned U.S. Pat. No. 6,415,364 to Bauman, et al. This system uses interleaving to expedite transfers from the directory. Specifically, the system initiates a first read operation to a first memory bank of the directory. This operation reads directory data onto a directory data bus, updates the data, and then writes the data back to the first memory bank. While the write portion of this operation is completing, the read portion of a second read-modify-write operation is initiated to a second memory bank. The directory data from the second memory bank has been read and is available for modification at the time the first write operation has completed. Thus, the time to perform the second read-modify-write operation has been partially "buried" by the first operation. This increases directory throughput.

The above-described system has several opportunities for improvement. First, the sequential interleaved read-modify-write operations are performed serially over the same shared directory bus. That is, data for the first operation is read via the directory data bus, updated, and then stored back to the first memory bank via the directory data bus. Data for the second operation may then be read via the directory data bus, and so on. Thus, the speed of operation is limited by the settling time required to change direction of the directory data bus. As memory speeds increase, interleaving cannot increase throughput enough to make directory access times transparent.

In addition to the foregoing, prior art systems such as that described in the Bauman patent require the use of customized bi-direction transceivers and interface logic that can receive data from two sources substantially simultaneously. These transceivers are adapted to store modified directory data for a first read-modify-write operation at substantially the same time data for a second read-modify-write operation is being received from a second memory bank. Because this specialized interface logic is required for this type of interfaced design, off-the-shelf Dual In-line Memory Modules (DIMMs) cannot be incorporated into the system. This makes the system less flexible, and more expensive.

What is needed, therefore, is an improved directory storage system that addresses the foregoing limitations.

SUMMARY OF THE INVENTION

The current invention provides a system and method that allows directory references to be completed in a manner that does not limit memory performance. The system may be implemented without employing specialized interface logic, thereby allowing for the use of off-the-shelf memory components.

According to the inventive system and method, a storage system is provided that includes both a data storage system to store data signals, and a directory system to store state information that describes the state and location of the most recent copy of the data signals. In one embodiment, the data storage system stores data in addressable units called cache lines. The directory stores a respective directory entry for each of the cache lines within data storage system.

Requests are issued to read data signals from, and write data signals to, the storage system. These requests, which may be issued by one or more instruction processors, input/output processors, or other types of requesters, are stored in a queue awaiting presentation to the storage system.

Queued requests are grouped into sets. The requests within a same set are issued in succession to the data storage system to initiate a read or write memory operation to the cache line addressed by the request. At the same time, a respectively associated directory entry is read from the directory system for each of the cache lines referenced by the requests within the set. The directory entries are updated to reflect the new state and location of the associated cache line based on the type of the request, the previous state of the cache line, and on the identity of the requester. The updated directory entries for all requests in the set are stored back to the directory in succession. As a result, the interface to the directory system need only undergo a single direction change to complete the processing of all directory entries for the set of requests. This significantly reduces the directory access time, allowing the directory access time to become a non-limiting factor when performing requests to the storage system.

According to one embodiment of the invention, the data storage system may include multiple independently addressable address ranges. Each address range may be provided by a different addressable storage device, for example. Each request within a set is selected to map to a different address range as compared to the other requests in the set.

In one method of using the foregoing embodiment, a set is created to include a pending request that maps to any of the address ranges within the data storage system. This request is issued to the data storage system and the directory system. A predetermined time before the requested reference to the data storage system is completed, a search is performed for another pending request that maps to a different addressable address range as compared to the first request. If such a request is located, this subsequent request is issued to the different address range before the memory access initiated by the prior request has been completed. This method allows the time for processing of the requests to be overlapped to increase the efficiency with which the requests of a set are processed.

The foregoing method of adding requests to a set may be repeated a predetermined number of times. In one exemplary data storage system that includes four independently addressable address ranges, up to four requests are added to a set before the set is considered completed.

According to another aspect of the current invention, each of the independently addressable address ranges within the data storage system is provided by a respective memory bank. One or more memory banks within the data storage system maps to a memory bank within the directory system. A set is created so that no two requests in the set address memory banks within the data storage system map to the same memory bank within the directory system.

According to another aspect, a set may include fewer than the maximum number of requests. This may occur if a search does not locate a pending request to an address range that is not already represented within the set. In this case, the set is considered complete even though fewer than the maximum number of requests is included within the set. The included requests are processed to completion before another set is created. As an alternative to this embodiment, processing of requests may be delayed until an eligible request becomes available so that the maximum number of requests is always included within the set. However, this alternative embodiment has the disadvantage of imposing a greater amount of latency in the processing of pending requests.

Another aspect of the invention selects requests not only on the address range associated with the request, but also on the amount of time the request has been pending. That is, the oldest request that is pending to an eligible address range will be selected for addition to the set.

According to one aspect of the invention, a storage system is disclosed that includes a data storage device to store data signals, and a directory device to store directory entries. Each directory entry describes the state of respective data signals. The storage system further includes expansion control logic coupled to the data storage device and the directory device to submit a set of multiple requests to the data storage device. Each request references addressed ones of the data signals. Finally, the storage system includes next state logic coupled to the directory device to read, and to update, multiple directory entries, each describing the state of data signals referenced by a different one of the requests. The next state logic stores each of the updated directory entries back to the directory device in succession.

According to another embodiment, a method is discloses that may be employed with a data storage system that stores data signals, and a directory that stores directory entries for the data signals. The method, which is provided to handle requests that are pending to the data storage system, includes issuing multiple selected ones of the pending requests to the data storage system. The method further includes, retrieving from the directory, and updating, a directory entry for each of the selected requests. After all directory entries addressed by the selected requests are retrieved, these directory entries are stored back to the directory.

In still another embodiment, a method is disclosed for use with a data storage system that stores data signals, and that further includes a directory to store state information describing respective ones of the data signals. The data storage system includes multiple independently addressable storage devices. The method involves the handling of requests that are requesting access to data signals stored within the data storage system. The method includes the steps of creating a set of requests, with each request in the set addressing a different one of the storage devices, and issuing the requests in the set to the data storage system. For each of the requests in the set, state information is read from the directory and updated to reflect the next state of the data signals addressed by the request. After the state information for each request in the set has been read from the directory, the updated state information for each request in the set is stored back to the directory.

According to another aspect, a data processing system is described that includes at least one requester to issue requests, and a storage system coupled to the at least one requester. The storage system includes a data device to store data signals requested by the requests, a directory to record directory entries, each describing respective ones of the data signals, and a request queue to store requests pending to the data device. The storage system further includes an expansion control circuit coupled to the request queue to select multiple ones of the pending requests for issuing to the data device. The expansion control circuit initiates retrieval of a respective directory entry for each of the selected requests, and after retrieval of all directory entries for the selected requests, initiates storing of updated copies of the retrieved directory entries to the directory.

According to yet another aspect of the invention, a storage system is disclosed that includes data storage means for storing data signals, directory means for storing directory entries, and port means for receiving requests. Each request addresses data signals that are stored within the data storage means, and further addresses a respective directory entry in the directory means. Expansion control means is provided for selecting a set of the received requests, for issuing the set of requests to the data storage means for processing, and for initiating retrieval of all directory entries addressed by the set of requests so that the directory entries may be updated. Following retrieval of all directory entries addressed by the set of requests, expansion control means initiates storing all directory entries addressed by the set of requests back to the directory.

Other scopes and aspects of the current invention will become apparent from the following description and accompanying drawings.

BRIEF DESCRIPTION OF THE DRAWINGS

FIGS. 8a and 8b, when arranged as shown in FIG. 8, are a timing diagram illustrating the processing of four read requests that are included within the same set.

DETAILED DESCRIPTION OF THE DRAWINGS

Figure 1:
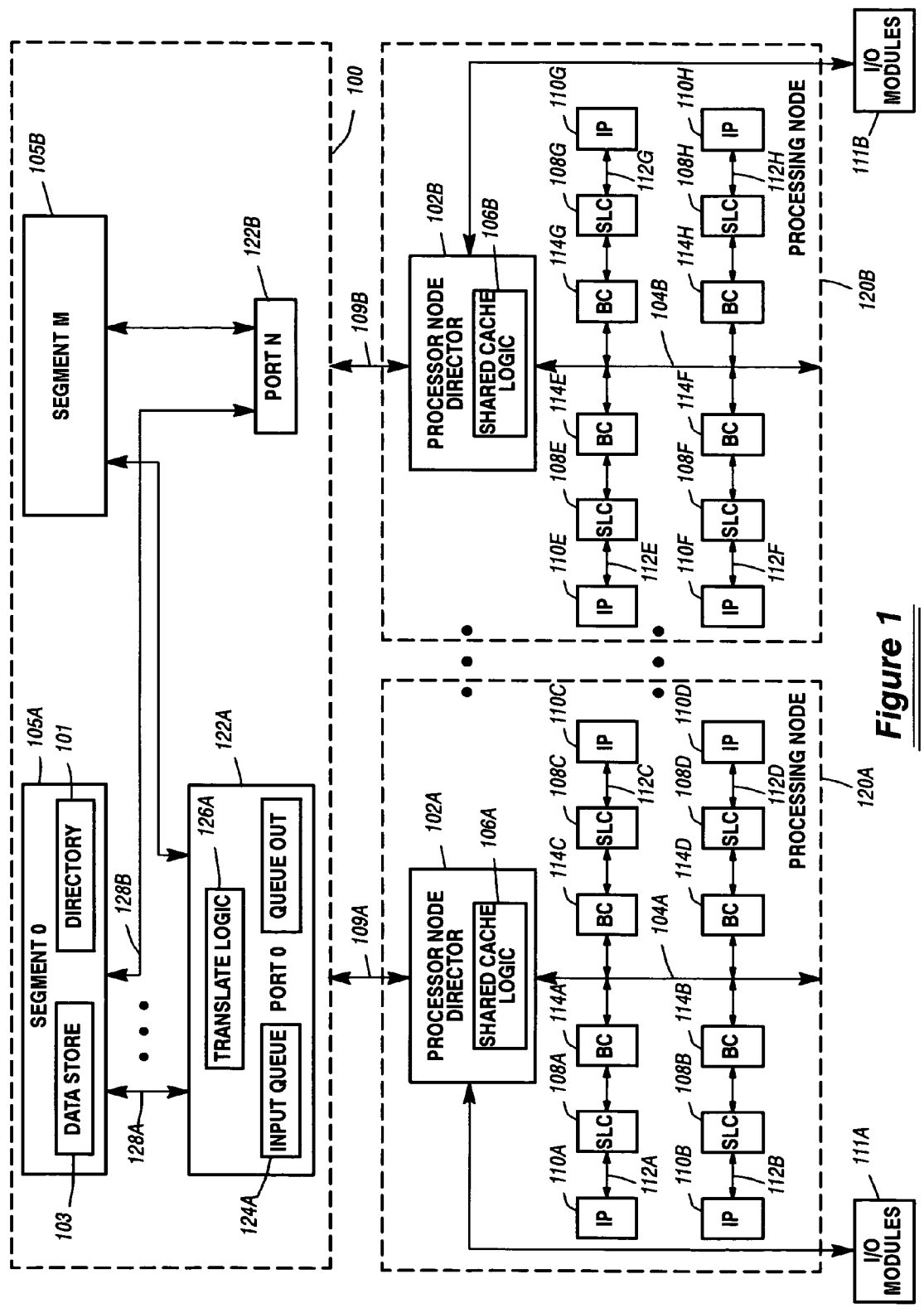
FIG. 1 is a block diagram of an exemplary data processing system that may utilize the current invention.

FIG. 1 is a block diagram of an exemplary data processing system that may employ the current invention. The system includes a Storage Coherency Director (SCD) 100 that provides the main memory facility for the system. Although for simplicity only a single SCD is shown, it will be understood that in a larger system, multiple SCDs are provided, each supporting a respective portion of the overall address range of the system.

SCD 100 includes multiple segments shown as segment 0 105A through segment M 105B, each supporting a portion of the overall memory range provided by the SCD. Each segment includes a data store to retain data, and a directory to store directory information. For example, segment 0 105A includes data store 103 and directory 101. Other segments are similarly configured.

In one embodiment, data store 103 stores data in addressable units called "cache lines". A cache line in the current embodiment includes 128 bytes, although any other cache line length may be used in an alternative embodiment. For each cache line included within data store 103, directory 101 stores a respectively associated directory entry that indicates the state and location of the most recent copy of the cache line. This information is employed to ensure that every processor within the system is operating from the latest copy of the cache line data.

SCD 100 is coupled to one or more Processor Node Directors (PNDs) shown as PNDs 102A and 102B. The system may include more or fewer PNDs than that shown in FIG. 1. Each PND is coupled to SCD 100 over one or more high-speed SCD interfaces shown as interfaces 109A and 109B. In the current embodiment, each interface includes data, address, and function lines.

Each PND includes logic to interface to the high-speed SCD interface, and further includes logic to interface to a respective processor bus such as processor bus 104A or 104B. These processor buses can employ any type of bus protocol. Each of PNDs 102A and 102B includes shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B. Each processor bus further couples to multiple local cache memories through respective Bus Controllers (BCs) 114. Each BC controls the transfer of data to and from the processor bus in a manner that conforms to bus protocol. In the current embodiment, Second-Level Caches (SLCs) 108A-108D are coupled to processor bus 104A via BCs 114A-114D, respectively. Similarly, SLCs 108E-108H are coupled to processor bus 104B through BCs 114E-114H, respectively. In another embodiment, these local SLCs may be Third-Level Caches.

Each SLC 108 is also coupled to a respective one of the Instruction Processors (IPs) 110A-110H over a respective interface 112A-112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on an Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A-114D, SLCs 108A-108D, and IPs 110A-110D may be referred to as processing node 120A (shown dashed). Similarly, PND 102B, processor bus 104B, and all entities associated with processor bus 104B comprise a second processing node 120B (also shown dashed). Many other processing nodes may exist within the system.

Each processing node may be coupled to one or more I/O complexes, shown as I/O complexes 111A and 111B. Each of these I/O complexes contains one or more industry-standard or proprietary I/O modules that communicate with storage medium such as disk tape subsystems and communication equipment.

Next, the retrieval of data by an IP is considered. During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all BCs on a processor bus implement a snoop protocol to monitor, or "snoop", the processor bus for requests. In the current example, BCs 114B-114D snoop the request initiated by IP 110A and SLC 108A. The snooped request is transferred by each BC to its associated SLC to determine whether that SLC has a modified copy of the requested cache line. If so, the cache line copy will be returned to requesting SLC 108A via processor bus 104A during a Processor Bus Write-Back (PBWB) operation. Additionally, SLCs 108B-108D may have to invalidate any stored copies of the data depending on the type of request made by SLC 108A.

PND 102A also snoops the request from SLC 108A. PND 102A determines whether shared cache logic 106A stores the most recent copy of the requested data. If so, the data will be provided by PND 102A to SLC 108A.

In some instances, data requested by IP 110A is not resident within any of the cache memories associated with processor bus 104A. In that case, PND 102A must forward the request to SCD 100. The request is received by port 0 122A of SCD 100, and is stored within input queue 124A.

A logical address is included with each request. This address is provided to translate logic 126A for translation into a physical address that maps into one of memory segments 0 105A through M 105B. When the request gains priority, it is transferred to the appropriate one of the memory segments over one of memory interfaces 128A through 128B for processing.

The request is processed by the selected memory segment, which determines the location and state of the current copy of the requested data using information stored within its directory. The most current copy may reside within the SCD itself. If so, the SCD provides the data directly to PND 102A. In other cases, the requested data is stored within a cache memory of a different processing node. In this instance, the way in which the request is handled depends on the type of request made by IP 110A, and the current state of the data, as determined by state information stored within the directory. For example, if IP 110A is requesting read access, and if the processing node that stores the data has not updated that data, the SCD may be able to return the data directly to IP 110A without accessing the other processing node.

In another scenario in which IP 110A is requesting "ownership" of the data so that a write operation can be performed, and further if the other processing node currently retains ownership of the data so that updates can be made within that other processing node, the SCD must retrieve the data from the other processing node. This is accomplished by issuing a port snoop request to a queue (not shown) contained within the appropriate one of the ports such as port N 122B. The manner in which this is accomplished is largely beyond the scope of the invention. Eventually data will be returned from the other processing node so that it can be provided to the requesting IP, which in this example is IP 110A.

As can be appreciated, system throughput can be increased by minimizing the latency associated with requests made to SCD 100. This can be accomplished, in part, by ensuring that the time required to access the directory does not limit the overall rate at which requests can be completed to the SCD. This is discussed further below.

Figure 2:
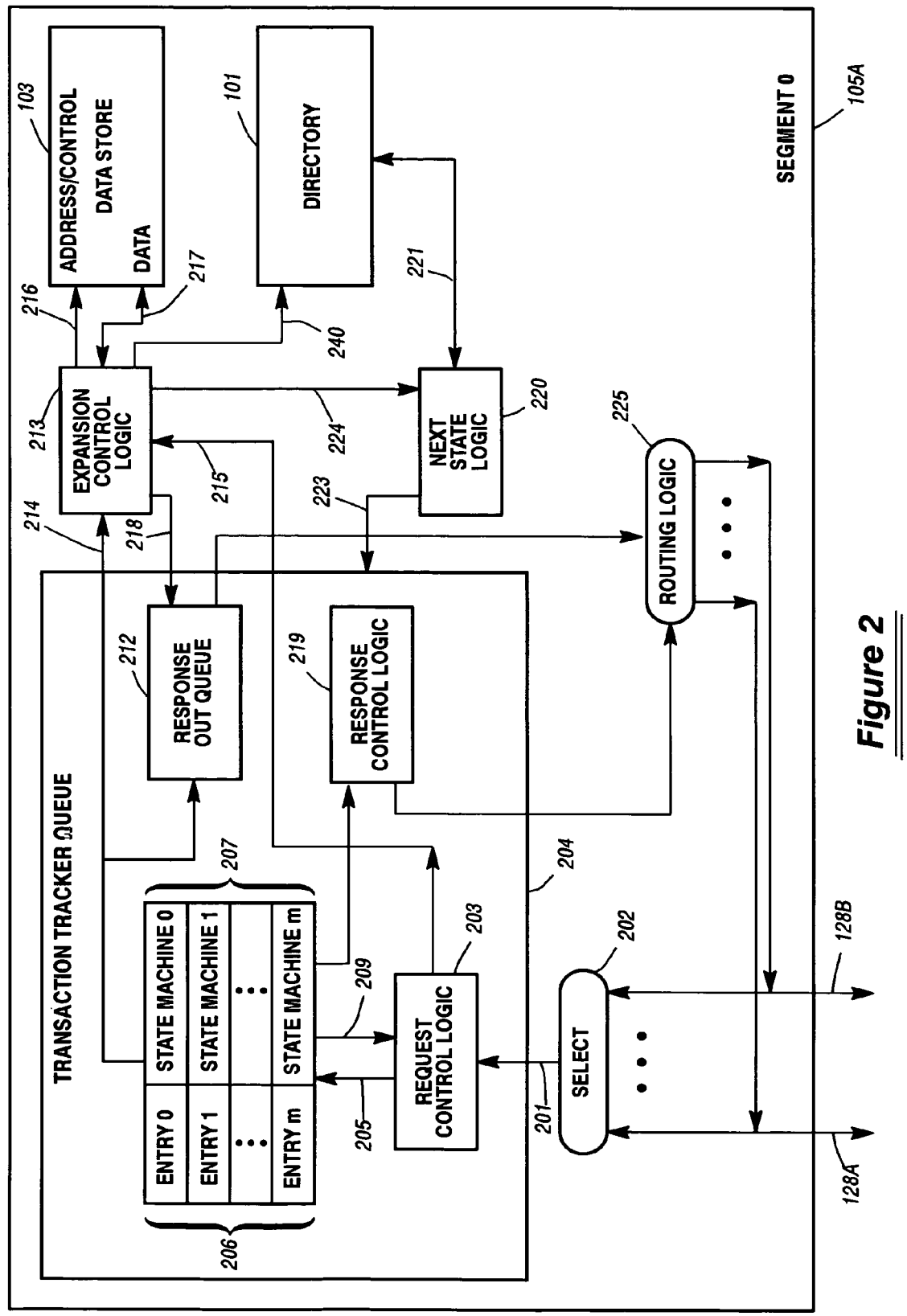
FIG. 2 is a more detailed view of a segment of the Storage Coherency Director (SCD).

FIG. 2 is a more detailed view of a segment of SCD 100. Although segment 0 1105A is shown and described, it will be understood this discussion likewise applies to the other segments within SCD. As discussed above, segment 0 105A interfaces to ports 0 122A through N 122B via interfaces 128A through 128B, respectively. Requests provided via any of these interfaces are provided to select logic 202. Select logic includes logic that selects one of the pending requests based on a fairness algorithm. In one embodiment, a round robin approach is employed. Any other fairness mechanism may be used in the alternative to serialize the requests that may be received in parallel from the multiple ports. The selected request is then transferred on interface 201 to Transaction Tracker Queue (TTQ) 204.

When TTQ 204 receives a request, request control logic 203 stores the request within one of TTQ entries 206. Each entry is associated with a respective one of state machines 0 through m 207. Each state machine processes the request stored within the associated request entry. When a new request is stored within TTQ 204, the respective state machine is activated to track processing activities and to control the use of these TTQ queues for that request.

In one embodiment, the requests are submitted to the TTQ 204 using a "split transaction" mechanism. This means that address and control signals associated with a request are transferred to the SCD during a first transfer operation, and any associated data is transferred to the SCD during a different transfer operation. According to this embodiment, the address and function signals for a write-type request are stored within a TTQ entry to await receipt of the associated write data. When the write data becomes available within input queue 124A, the request within TTQ can then be processed. An alternative embodiment that does not employ a split transaction interface could be utilized in the alternative. In this case, any write data is included with the request, and is stored within the TTQ entry.

When any data needed to process a request has been received, the TTQ state machine recognizes the request is eligible for processing by data store. These eligible requests will be processed according to a request selection mechanism to be described below. When a request gains priority, the request address is provided to expansion control logic 213 on lines 214. In an embodiment employing split transaction interfaces, any write data associated with the request is forwarded on lines 215 to expansion control logic 213 from input queue 124A by request control logic 203. In an alternative embodiment, the data is provided directly from TTQ 204.

Expansion control logic 213 initiates a request to data store 103, providing the request address and control signals on lines 216 and any data on lines 217. Also at this time, the request address is provided on lines 240 to directory 101 to obtain the directory entry associated with the requested cache line of data. In one embodiment, the two least-significant bits of the request address are not used when addressing the directory.

When a request is provided to data store 103, a full cache line of data will be read from, or written to, data store based on the request type. Read data is provided on lines 217 to expansion control logic 213, which then forwards corrected data to response out queue 212 on lines 218. This data can then be provided to the requester under the control of response control logic 219 and routing logic 225.

While data is being read from data store 103, the address on lines 240 reads the directory entry for the addressed cache line from directory 101. As discussed above, this directory entry includes state information that indicates the location and state of the most recent copy of the associated cache line. The state information is provided to next state logic 220 on interface 221, and is thereafter forwarded to TTQ 204 on lines 223 for use in fulfilling the request. This cache line state information is further used by next state logic 220 to determine the next state for the cache line based, in part, on the type of the request and the identity of the requester, as identified by information provided by expansion control logic 213 on lines 224. Next state logic 220 then writes the updated state information back to directory 101 on interface 221 under the control of control signals provided on lines 224 by expansion control logic 213. The algorithm used to modify the directory entry is beyond the scope of the current invention. One embodiment of updating the directory entry is discussed in detail in commonly assigned co-pending U.S. patent application entitled "System and Method for Providing Speculative Ownership of Cached Data Based on History Tracking", Ser. No. 10/304,919 filed Nov. 26, 2002.

As discussed above, most references to directory 101 involve read-modify-write operations. State information is read from the directory, updated, and stored back to the directory. In most prior art systems, this read-modify-write operation cannot be completed as fast as the (single) associated read or write data access to data store 103. This limits the rate at which requests may be processed by data store.

Figure 3:
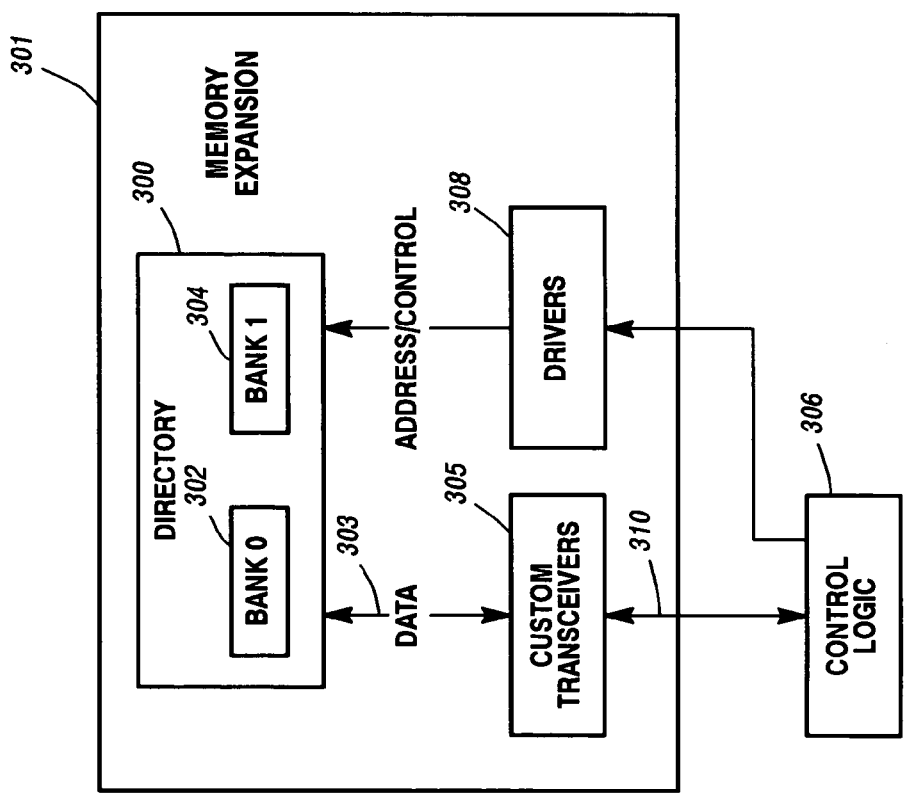
FIG. 3 is a prior art system that employs customized interface logic to decrease latency associated with memory references.

FIG. 3 is a prior art system that addresses the foregoing problems by employing an interleaved scheme implemented using customized interface logic. A system of this type is disclosed in commonly assigned U.S. Pat. No. 6,415,364 to Bauman et al. According to this system, a memory device shown as memory expansion 301 includes a directory 300. This directory includes multiple, independently addressable memory banks. FIG. 3 illustrates two such banks, bank 0 302 and bank 1 304, although additional banks may be included. According to this system, control logic 306 initiates a read operation to directory 300 by providing an address via drivers 308. A directory entry is read from bank 0 302 on interface 303, is latched by custom transceivers 305, and is forwarded to control logic 306 on interface 310. In the mean time, control logic 306 initiates a second read operation to a different bank, such as bank 1 304.

Next, control logic 306 updates the directory entry that was retrieved from bank 0 302. This updated entry is stored to customer transceivers 305 via interface 310. Around this same time, data is received on interface 303 from the other bank, such as bank 1 304, and is stored in customer transceiver 305. The data from bank 1 304 may then be forwarded to control logic 306 for modification at the same time the updated data stored within custom transceiver 305 is transferred to bank 0 302 via interface 303.

The above-described system allows multiple read-modify-write operations to be completed in an interleaved manner. This increases the efficiency of the directory so that directory access times can approximate that of an associated data store. This approach provides several opportunities for improvement. According to the system of FIG. 3, memory expansion 302 includes customized transceivers provided to allow for the type of interleaved operation that is discussed above. This customized logic is not available in off-the-shelf memory components such as commercialized Dual In-line Memory Modules (DIMMs). Because custom logic is required, system costs are increased and flexibility is diminished.

In addition to the foregoing, it may be noted that the access rate of the directory of FIG. 3 is limited by the minimum settling time on interfaces 303 and 310. For example, the settling time of interface 310 is the minimum time between the disabling of custom transceivers 305 and the enabling of control logic 306 to drive interface 310, or vice versa. The rate at which memory expansion 301 may be accessed cannot be increased beyond that dictated by this fundamental circuit characteristic. Thus, an improved system is needed that can be implemented using commodity components, and that will allow directory speeds to increase to match the faster access times now available from modern memory systems.

Figure 4:
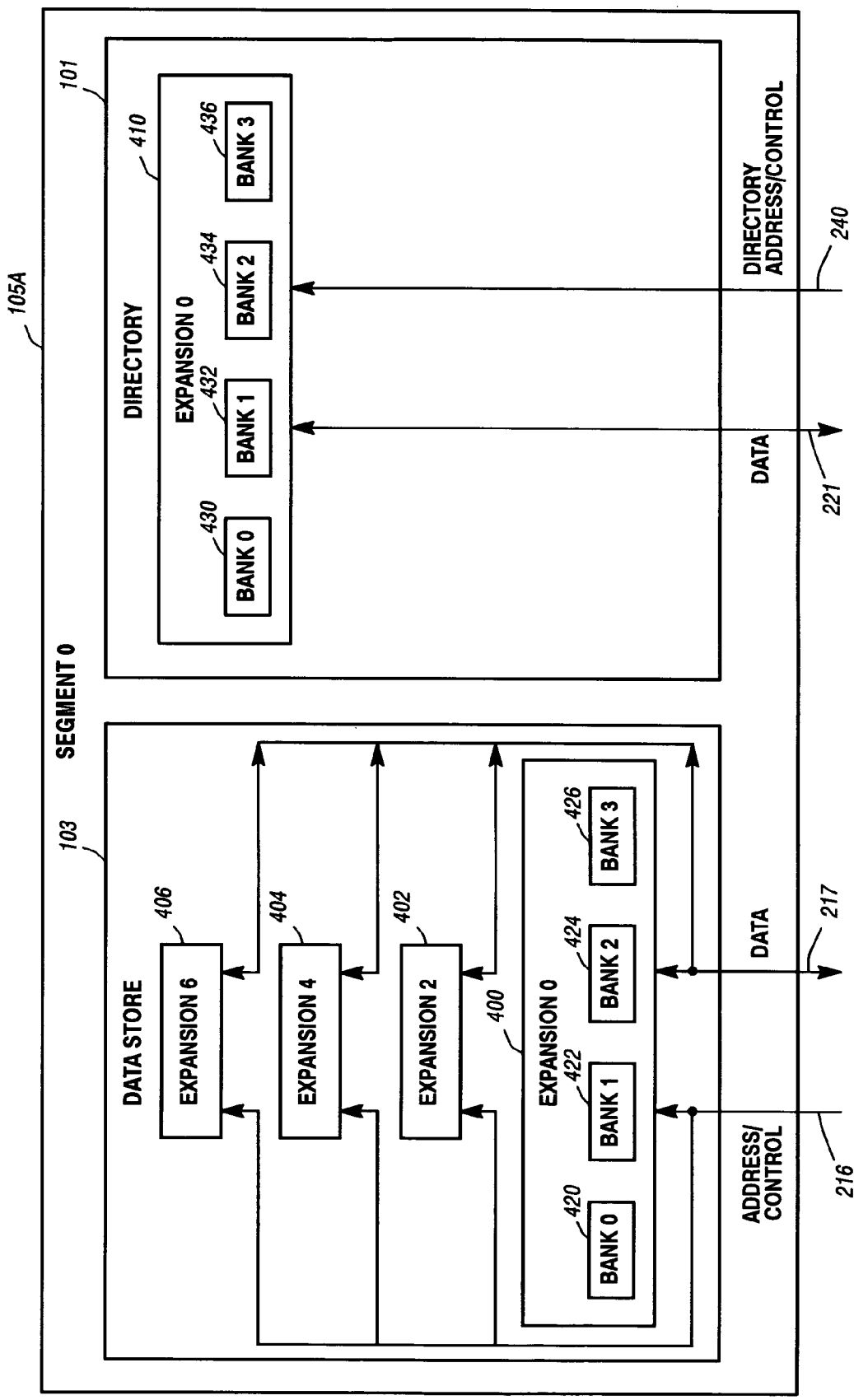
FIG. 4 is a block diagram of one embodiment of the directory and data store of a memory segment according to the current invention.

FIG. 4 is a block diagram of the directory and data store of segment 0 105A according to the current invention. Data store 103 of segment 0 is shown to include four memory expansions 0 400 through 6 406, although more or fewer expansions may be employed. In a minimum configuration, only a single expansion will be present. Even-numbered expansions are included within segment 0, and odd-numbered expansions (not shown) are included within a different segment such as segment M 105B. This naming convention is largely arbitrary, however.

Each of the memory expansions is independently addressable, and may be populated with one or more commercially available, off-the-shelf DIMMs. In one embodiment, each of the expansions includes four independently addressable banks, shown as bank 0 420, bank 1 422, bank 2 424, and bank 3 426 for expansion 0 400. Each of the other expansions 2 through 6 is similarly configured. More or fewer banks may be included within each expansion in alternative embodiments.

As discussed above in reference to FIG. 2, expansion control logic 213 provides address and control signals to an addressed one of the expansions on lines 216. Write data is stored to, and read data is read from, the addressed expansions on lines 217. As discussed above, in the current embodiment, each data transfer involves a cache line of data that is 128 bytes in length, although other cache line sizes may be employed.

Each access to data store 103 is accompanied by an access to directory 101. Directory 100 includes a single memory device shown as expansion 0 410. In one embodiment, expansion 0 is configured in a manner that is similar to that of expansions 0 through 6 of data store 103. That is, directory includes four independently addressable banks, shown as bank 0 430, bank 1 432, bank 2 434, and bank 3, 436. More or fewer banks may be provided in a different embodiment.

Each cache line of data stored within expansions 0 through 6 in data store 103 maps to a respective directory entry within expansion 0 410 of directory 101. In the current embodiment, the directory entries for the cache lines stored within any of banks 0 of expansions 0 400 through expansion 6 406 will be stored within bank 0 430 of the directory 101. Similarly, directory entries for cache lines stored within any of banks 1 of data store 103 will be stored within bank 1 432 of the directory 101, and so on. This mapping allows the same request address that is used to retrieve or store a cache line from/to data store 103 to be used to retrieve the associated directory entry from directory 101. In a system that utilizes a different addressing scheme, an alternative mapping arrangement may be more desirable.

In the current embodiment, each directory entry is one word, or four bytes, long, although other entry sizes may be employed. According to this embodiment, a second unused word is read along with each one-word directory entry. This occurs because of the way in which the directory is addressed, and is largely beyond the scope of the current invention. It is sufficient to note that this second word is not used to determine the next state of the directory entry, but is always checked for errors and corrected as needed. This second word is stored back to the directory along with the updated one-word directory entry, as will be discussed further below.

According to the current invention, references to both data store 103 and directory 100 occur in a burst mode. Up to four requests are retrieved from TTQ 204 by expansion control logic 213. These requests are selected from TTQ so that each maps to a different one of banks 0 through 3 within any of expansions 0 through 6 as determined by the request address. That is, the four requests may map to the same, or different, expansions within data store 103, so long as all requests map to a different bank. This is necessary to ensure that each request maps to a different bank within directory 101.

Assuming that four requests are issued in succession to the expansions, four read and/or write operations are initiated. In the mean time, four successive read requests are issued to directory 101 via address/control lines 240 to read the directory entries that are associated with the four addressed cache lines. These directory entries are provided on interface 221 to next state logic 220. Each of the directory entries is, in turn, updated by next state logic 220. These updated entries are stored back to directory 101 during four successive write operations. During this sequence of events, only a single settling time need be provided to accommodate for the switching of drivers on interface 221. This is a significant improvement over prior art systems which required that a settling time be provided for each of the four transfer operations. Because of the elimination of this requirement, access times for directory 101 approximate those for data store 103 without the use of custom logic components. Moreover, the size of the "set", which in this case includes four requests, can be increased to any number needed to achieve the desired performance levels. The system and method used to support the transfer of a set of requests is discussed in reference to the remaining drawings.

Figure 5:
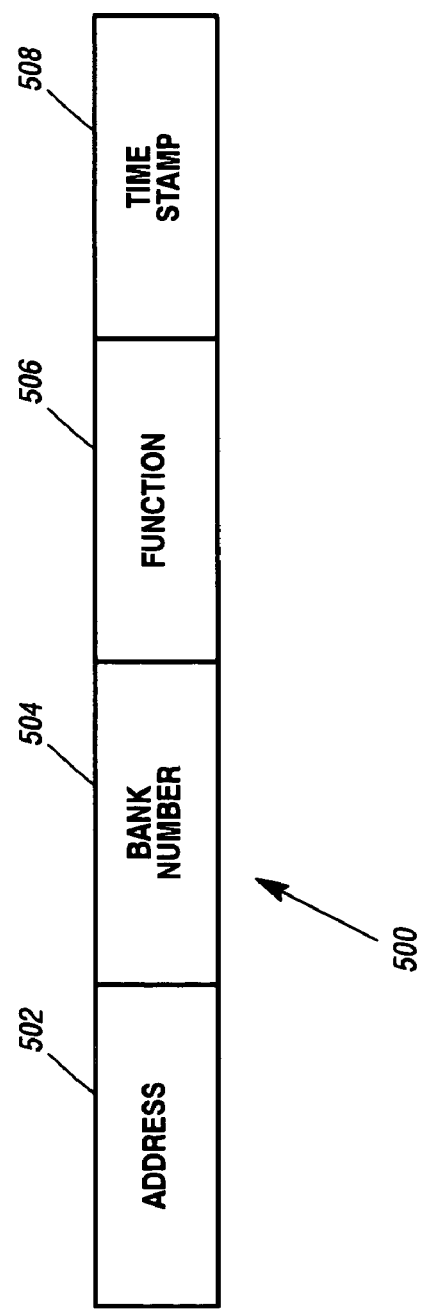
FIG. 5 is a diagram of an exemplary TTQ entry.

FIG. 5 is a block diagram of an exemplary entry 500 as may be stored within TTQ 204 following receipt of a request. In this embodiment, the TTQ entry includes a request address 502, and a bank number 504. The bank number is generated by translate logic 126A to identify one of banks 0 through 3 to which the request address maps. That is, the request address will map to one of expansions 0 400 through 6 406. Within that expansion, the request address will further map to one of the four banks 0 through 3 as identified by the bank number 504.

A TTQ entry further includes function signals 506 that indicate the type of the request. For example, the request may be a read request that is requesting a shared copy of the addressed data, a read request that is requesting ownership of the data, or a write request. Other request types are possible, although these types are beyond the scope of the current invention. The TTQ entry further includes a time stamp 508 that indicates the amount of time a request has been stored within TTQ 204. Other fields may be added to a TTQ entry as needed.

Figure 6:
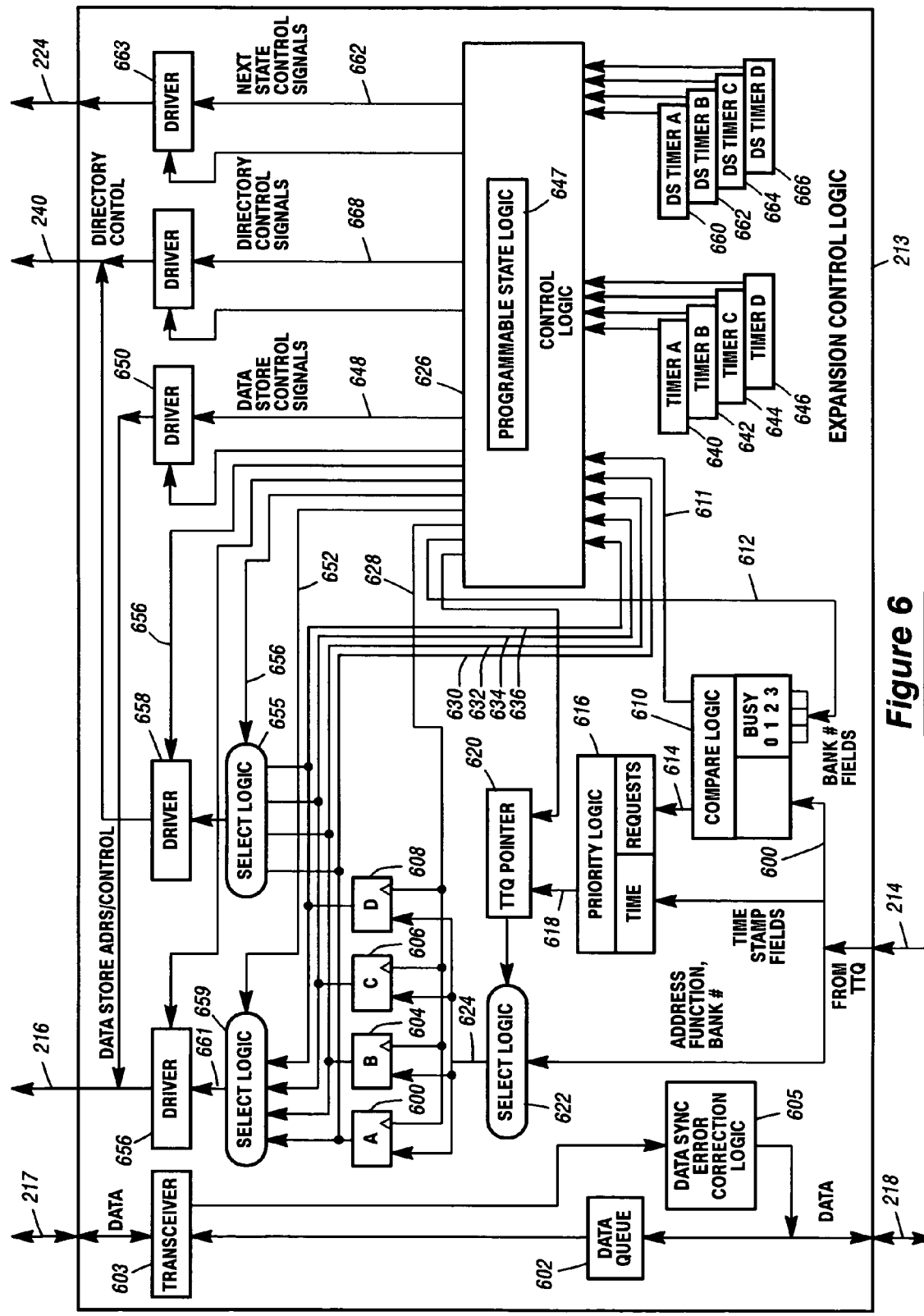
FIG. 6 is a logic block diagram of the expansion control logic of one embodiment of the invention.

FIG. 6 is a block diagram of expansion control logic 213. Expansion control logic selects requests from TTQ for presentation to data store 103. Recall that according to the invention, requests are submitted in a burst mode that groups requests into sets. A set optimally includes up to four requests, each one mapping to a different one of expansions 0 400 through 6 406.

The use of sets can best be understood by example. After a given set of requests has been processed, a new set is created. To accomplish this, expansion control logic 213 searches TTQ 204 for the oldest valid request based on the time stamp field 508 of each of the requests. The selected request, which may map to any of banks 0 through 3 within any of expansions 400 through 406, is stored within register A 600. For this example, it will be assumed the request address maps to bank 0 420 of expansion 400. Processing of this request is initiated by providing the request address and the appropriate control lines to the addressed expansion within data store 103 via address interface 216. If the request is associated with write data, this data is transferred from input queue 124A to data queue 602. Data within data queue 602 is then forwarded to the addressed bank and expansion of data store 103 via transceiver 603 and interface 217 at the appropriate time.

If the request is instead reading data from data store 103, the read data is eventually provided on lines 217 to transceiver 603 where it is forwarded to data synchronization and error correction logic 605. This logic utilizes a data strobe provided with the data by the expansion to synchronize the data to the circuits external to the DIMMs populating the expansion. Data synchronization and error correction logic further utilizes check bits provided with the data to detect and correct any errors that may have occurred in the data. The corrected data is provided on lines 218 to response out queue 212 in preparation to be forwarded to the requester in the manner discussed above.

At approximately the time address and control signals are provided on interface 216 to data store 103, address and control signals are provided on interface 240 to read the directory entry associated with the requested address in data store. Recall that since the request address maps to one of the banks 0 of data store 103, the associated directory entry will be stored within bank 0 430 of directory 101 in the current embodiment. This directory entry is transferred to next state logic 220 via interface 221.

A predetermined time period before the current request is completed, expansion control logic 213 begins another search of the TTQ. During this search, the oldest pending request that maps to any of banks 1 through 3 of any of expansions 0 400 through 6 406 will be selected. A request to bank 0 of any of these expansions will not be selected since an access to bank 0 430 within directory 101 has already been initiated for the current set. The next selected request is stored within register B 604, and a reference is initiated to the addressed expansion and bank in the manner discussed above. This reference will be initiated when interface 216 becomes available. This process is repeated two additional times so that each of registers 600, 604, 606, and 608 stores a request that maps to a different one of banks 0 through 3 within any of expansions 0 through 6 of data store 103. It should be reiterated that in the current embodiment, it does not matter whether the request addresses within the same set map to the same expansion, or to different expansions. It is only important that each request address maps to a different bank within the one or more expansions of data store 103.

During the four successive operations that are associated with the same set, four associated directory entries are read from expansion 0 410 of directory 101 via interface 221 to next state logic 220. Each of these directory entries is read from a different one of the independently addressable banks 0 430 through bank 3 436 of expansion 0 410. Next state logic updates each directory entry based on the current state of the directory entry, and on the type of request being issued, as indicated on lines 224 from expansion control logic 213. This updated entry is not stored back to directory until all four directory entries associated with the current set have been read. Thereafter, all of the updated entries associated with the set are stored back to directory 101 during four successive write operations. As a result, only a single settling time is required on interface 221 between the time directory 101 discontinues, and next state logic 220 begins, driving the interface. The throughput of directory 101 is therefore substantially increased. The time required to access data store 103 for the requests in the set approximates, or even exceeds, that required to process the directory entries, and the directory references are therefore transparent for performance purposes.

The foregoing discussion assumes that a set will always contain four requests. This need not necessarily be the case. Recall that if a set does not yet include four requests, expansion control logic 213 will begin a search of the TTQ in attempt to locate another request to add to this set. This search will be initiated a predetermined time period before the previous request is completed. If an eligible request is not available within TTQ at this time as indicated by the activation of a signal on line 611 by compare logic 610, control logic 626 will consider the current set completed. The requests included within this set will be processed to completion so that updated directory entries are stored within directory 101. Then another set will be created.

With the above overview available for discussion purposes, the detailed operation of the circuit of FIG. 6 is described. Information from TTQ 204 is provided to expansion control logic 213 on lines 214. The bank number fields 504 for each of the valid requests stored within TTQ are forwarded on lines 600 to compare logic 610. Compare logic filters out all requests that are mapped to any bank for which a request has already been selected within the current set. The banks for which requests have been selected are indicated by busy signals on lines 612, which are generated by control logic 626. For instance, returning to the above-described example, after the request to bank 0 420 of expansion 400 has been added to a set and a reference to data store 103 has been initiated, a busy indicator is activated on lines 612 to signal that when selecting a second request to add to the set, any requests mapping to bank 0 of any of expansions 0 through 6 are to be excluded.

Compare logic 610 utilizes the busy indicators on lines 612 and the bank number fields on lines 600 to generate multiple signals on lines 614. Each of the signals on lines 614 is respectively associated with a TTQ entry. A signal is activated if the respective TTQ entry stores a valid request that is eligible to be considered for addition to the current set, as determined by the bank number field for the request. If none of the TTQ entries stores a valid request that is eligible to be considered for addition to the current set, compare logic 610 activates a signal on line 611 to control logic 626, as discussed above. This causes control logic to consider the request complete.

The signals on lines 614 are provided to priority logic 616 for prioritization according to the time stamp fields 508. In particular, priority logic receives the timestamp field 508 for each of the TTQ entries. These time stamps are used to select the TTQ entry storing the oldest pending one of the eligible requests. Priority logic provides signals on lines 618 that point to the selected TTQ entry, which is latched into the TTQ pointer storage device 620. The latched signals are used by select logic 622 to gate the request address, bank number, and function fields 502 through 506, respectively, from the selected TTQ entry onto lines 624.

Control logic 626 provides a signal on lines 628 to latch the request address, bank number, and function fields into an unused one of registers A 600 through D 608. In one embodiment, register A receives a request first, followed by register B, and so on. Any other scheme could be used to store signals within these registers.

The function and bank number signals that are latched into registers A through D are provided on one of interfaces 630 through 636, respectively, to control logic 626. Control logic 626 decodes the bank number fields to generate the busy signals on lines 612 in the manner discussed above. Control logic also uses the function and bank number signals to generate control signals that are used to address the DIMMs that populate each of the expansions 0 through 6. These signals are generated according to the timing requirements of the DIMMs using a corresponding one of four timers shown as timer A 640 through timer D 646 and state logic included within control logic 626. For example, control logic 626 utilizes timer A to generate the control signals for the request stored within register A 600, and so on. The control signals are provided on lines 648, and are driven by driver 650 onto interface 216. At the appropriate time, control logic 626 also generates a select signal on line 652 to select logic 659 to gate the appropriate one of the request addresses from registers A 600 through D 608 onto line 661. This address is driven by driver 656 onto interface 216 so that the request can be initiated to the addressed bank and expansion of data store 103.

In one embodiment control logic 626 includes programmable state logic 647. This state logic can be programmed to indicate the timing requirements of the DIMMS populating expansions 0 through 6 of data store. Control logic utilizes the output of timers A through D, as well as data stored within programmable state logic 647, to generate control signals on 216 according to the requirements of the DIMMS. This programmable capability allows data store 103 to be populated by a selected one of different types of memory devices, each having somewhat different timing requirements. Programmable state logic 647 may be programmed by a scan interface, as is known in the art, or some other type of programming interface.

When a request is initiated to data store 103, the request address is also selected by select logic 655 under the control of a select signal 656 generated by control logic 626. This request address is driven via driver 658 to interface 240 to address the appropriate bank of expansion 0 of directory 100. Additionally, control logic 626 uses the function signals for the current request to generate the control signals used to address expansion 0 of directory 101 in a manner similar to that discussed above for the data store. The control signals for the directory are generated according to the timing requirements of expansion 0 410 of directory 101 using an associated one of Directory Store (DS) timers A 660 through D 666. For example, DS timer A 660 provides the timing sequences that are needed to generate the control signals to read a directory entry that is associated with a request stored within register A 600, and so on. The directory control signals are provided on lines 668, and are driven by driver 670 onto interface 240.

As discussed above, in one embodiment control logic 626 includes programmable state logic 647. This programmable logic can be programmed to indicate the timing requirements of the DIMMS populating expansion 0 of directory 101. Control logic utilizes the output of DS timers A 660 through D 666, as well as data stored within programmable state logic 647, to generate control signals on 240 according to the requirements of these memory devices. This programmable capability allows directory 101 to be populated by a selected one of multiple types of memory devices, each having somewhat different timing requirements.

Expansion control logic 213 will attempt to add four requests to a set in the manner described above. If this is possible, each of registers A 600 through D 608 will store a respective request. Additionally, four associated directory entries will be read by next state logic 220 under the control of directory control signals provided to directory on interface 240. If a request is not located by a predetermined time period prior to the completion of a previous request as indicated by activation of line 611, control logic closes the set. In response, control logic initiates the logic sequences to store the updated directory entries for the current set into directory 101. Control signals to initiate this storing process are provided on lines 240 to directory 101, and on lines 224 to next state logic 220. These logic sequences are discussed further below in reference to FIGS. 8a and 8b.

Control logic 626 further generates next state control signals 662 used to control the modification and subsequent storage of each of the four directory entries. Specifically, when the directory entry for the request stored within register A is being modified, control signals 662 include signals that are generated based on the function field 506 of that request, which is received on lines 630 from register A 600. Control signals 662 are provided to driver 663, which forwards these signals on lines 224 to next state logic 220 for use in controlling the modification of the associated directory entry. This is repeated for each of the directory entries in the set.

After each directory entry is modified, control logic 626 generates additional control signals on lines 224 that are provided to next state logic 220 to cause this logic to store each directory entry back to expansion 0 410. Also at this time, control logic gates the address of each request in the set, one at a time, onto interface 240 via control signals 656. Finally, control logic 626 generates control signals that are provided on interface 240 to expansion 0 410 to control the storing of the modified directory entries for the requests in the set to the addressed one of the banks. As discussed above, control logic 626 utilizes DS timers A 660 through D 666 to generate the control signals in a manner that meets the timing requirements of the DIMMs populating expansion 0 410. According to one embodiment, when the request address stored within register A is gated to interface 240, DS timer A 660 is utilized to generate the associated control signals on interface 240, and so on. This process is repeated for each of the requests included within the set.

Figure 7:
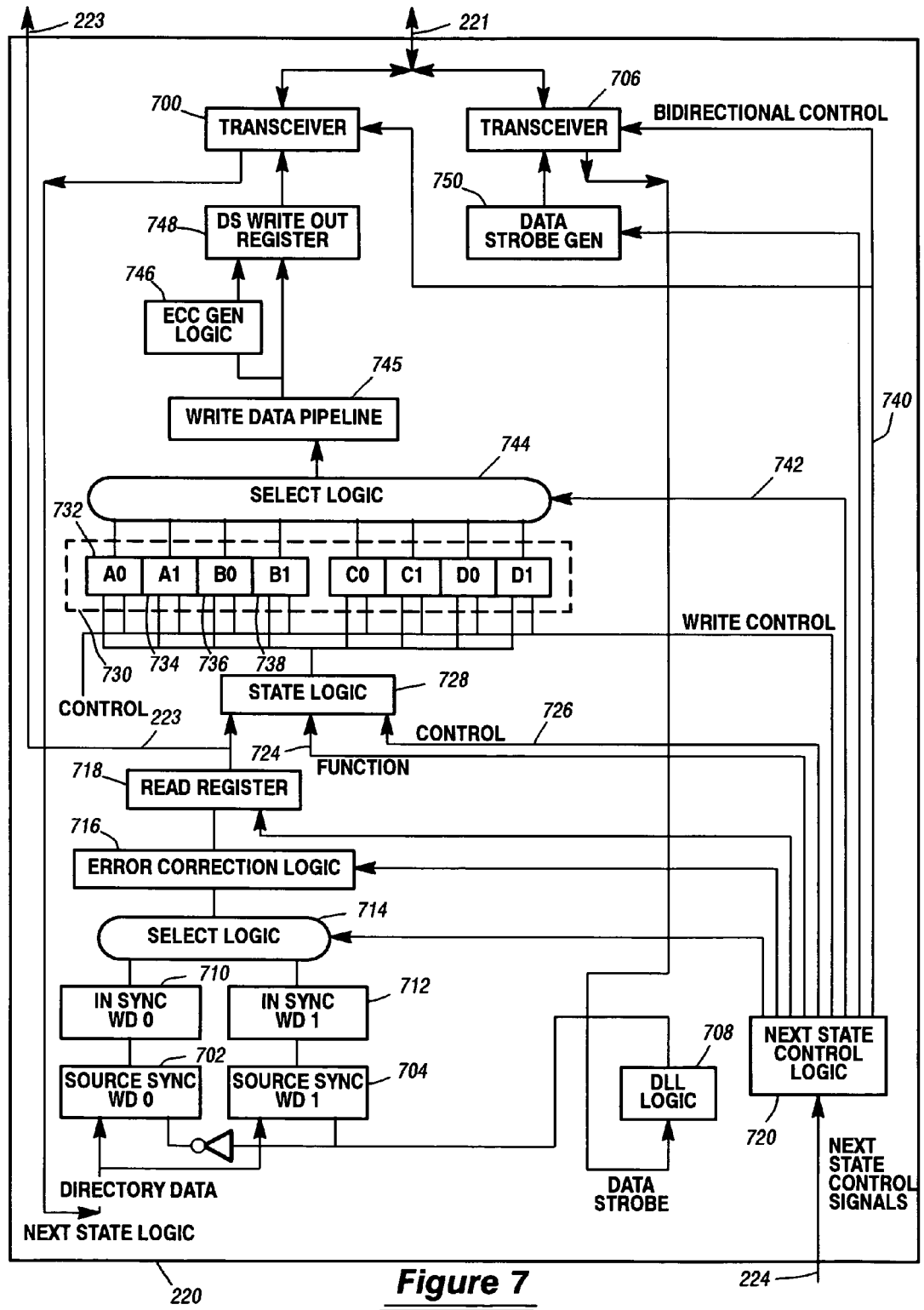
FIG. 7 is a logic block diagram of the next state logic of one embodiment of the invention.

FIG. 7 is a logic block diagram of next state logic 220. As discussed above, next state logic receives a directory entry from directory 101 on interface 221. In one embodiment, this directory entry includes two words of data read from expansion 410. This directory entry is provided to transceiver 700, and is forwarded to storage devices 702 and 704. This data is accompanied by a data strobe that is generated by expansion 410. This data strobe, which is synchronized with the data, is provided to transceiver 706, is forwarded to Delayed-Lock Loop (DLL) logic 708, and is employed to capture the directory entry in storage devices 702 and 704. The directory entry is re-captured within registers 710 and 712 to synchronize the data to the clock employed by next state logic 220. A first word of this directory entry is selected by select logic 714, and is provided to error correction logic 716. Error correction logic utilizes check bits provided with the data to scrub the word of any errors, and then provides the corrected data to read register 718. In one embodiment, the error correction logic utilizes an ECC code that corrects up to four adjacent bits and detects non-familial double bit errors. Other types of ECC schemes may be employed in the alternative.

The directory entry word stored within read register 718 is used to generate the modified directory entry. Generation of this modified entry is performed based on the next state control signals provided on lines 224 from expansion control logic 213. Recall that these signals are generated based, in part, on the function field 506 of whichever request is associated with the current directory entry. This function field 506 indicates the type of the request. For example, the function field may indicate the request is requesting update rights for the requested data. The next state control signals on lines 224 further provides timing signals that are needed when storing the modified directory entry back to expansion 0 410.

The next state control signals on lines 224 are provided to next state control logic 720, which decodes these signals to generate the various signals for controlling all of the next state logic 220. For example, the signals generated by next state control logic 720 control word selection by select logic 714, control enabling error correction logic 716, and storing of the corrected word to read register 718. In particular, next state control logic 720 also generates function and control signals that are further provided on lines 724 and 726, respectively, to state logic 728 for use in modifying the directory entries.

State logic is a state machine that generates the modified directory entry based on the current state of the directory entry, as indicated by the data stored within read register 718, and on the type of the current request, as indicated by the function and control signals on lines 724 and 726. In one embodiment, the updating of the directory entries may further be based on history information stored within the directory entry. As discussed above, this is largely beyond the scope of the current invention. More details regarding modification of directory entries is provided in U.S. patent application entitled "System and Method for Providing Speculative Ownership of Cached Data Based on History Tracking" referenced above.

In the foregoing manner, state logic 728 updates the word of the directory entry stored within read register 718. The updated data is stored within staging registers 730 (shown dashed). According to one embodiment, the updated first word of the directory entry for request A is stored within an A0 register 732 of staging registers 730. The second word of this modified directory entry will eventually be stored within A1 register 734. Similarly, the two modified words of the directory entry for request B will be stored within registers B0 736 and B1 738, and so on.

While the first word of the directory entry for request A is being modified by state logic 728, the foregoing process is repeated for the second word of the directory entry. Specifically, this second word is selected from register 712 by select logic 714, is provided to error correction logic 716 for any necessary correction, and is stored within read register 718. When modification for the first word has completed and the result is stored within A0 register 732, the second word undergoes modification and is stored within A1 register 734 of staging registers 730.

According to one embodiment, the second word of the directory is unused and may be reserved for future use, as discussed above. This unused second word is read from expansion 0 410 along with the first word because of the configuration requirements of the DIMMs populating the expansion. This word does not require any modification, and may be written directly by state logic 728 into A1 register 734. In other embodiments, each directory entry may include more or fewer words than in the current embodiment, with any portion of the directory entry being used.

While the second word of a directory entry for request A is being processed, and assuming the current set includes more than one request, the directory entry for the second request may be stored within registers 702 and 704 in the manner discussed above. This directory entry will be processed according to the above-described mechanism, with the modified directory entry being stored within registers B0 736 and B1 738 of staging registers 730. This process is repeated for each directory entry of each request in the set under the control of the signals generated by next state control logic 720, and based on the next state control signals on lines 224 that are provided by expansion control logic 213.

After all directory entries associated with the current set have been read from expansion 0 410, interface 221 is allowed to undergo a minimum required settling time during which expansion 0 discontinues driving the interface. After this settling time has elapsed, next state control logic 720 generates bi-directional control signals on line 740 to reverse the direction of transceivers 700 and 706, allowing them to drive interface 221. Next state control logic 720 further generates a signal on line 742 to allow select logic 744 to select the modified entry stored within registers A0 732 and A1734, which is then stored within write data pipeline logic 745. From there, the data is provided to Error Correction Code (ECC) generation logic 746, which generates the ECC code for the updated directory entry. The directory entry and the ECC code are then stored in DS write out register 748, and are driven onto interface 221 by transceiver 700.

A data strobe that is synchronized with the data is generated by data strobe generation logic 750. This data strobe is driven onto interface 221 by transceiver 706 along with the data. The data strobe is used by the DIMMs of expansion 0 410 to store the directory entry into the addressed one of banks 0 430 through 3 436. Expansion 0 further receives additional control signals that are provided on interface 240 by expansion control logic 213 in the manner discussed above.

The directory entries for each of the requests in a set are modified and stored back to expansion 0 in the manner discussed above. After all directory entries are stored back to the expansion on interface 221, a minimum settling time is imposed. When the settling time expires, the direction of this interface may again be switched to allow a directory entry associated with a first request in the next set to be read from expansion 0 so that the process can be repeated.

Figure 8A:
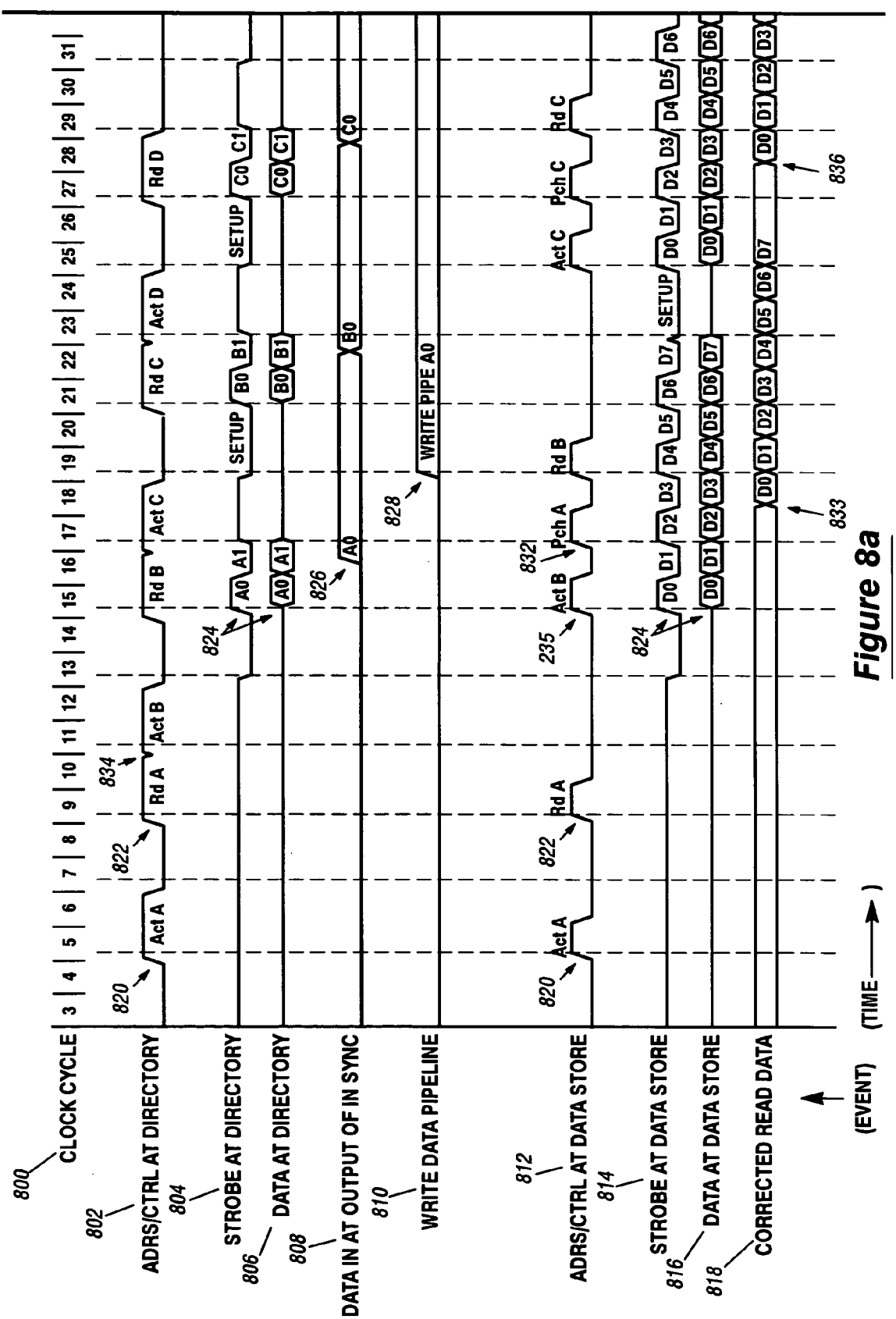

FIGS. 8*a* and 8*b*, when arranged as shown in FIG. 8, are a timing diagram illustrating the reading of four cache lines within the same set from data store 103, and the updating of the associated directory entries within directory 101. In reference to FIG. 8*a*, waveform 800 illustrates the clock cycles of a system clock signal provided to logic that is external to the DIMMs populating the data store 103 and directory 101. Waveform 802 illustrates the address and control signals provided on interface 240 to directory 101. In response, the DIMMS of directory 101 provide the data on interface 221 to next state logic 220, as illustrated by waveform 806. This data is accompanied by a data strobe, which is shown in waveform 804. As discussed above, this data strobe is used to latch a first (even) word of a two-word directory entry within register 702 of next state logic (FIG. 7), as illustrated by waveform 808. While waveform 808 only illustrates the even words of each two-word directory entry, the odd words are latched within register 704 one-half clock cycle later, and are not shown for ease of reference.

A directory entry is corrected and updated to indicate the next state of the associated cache line, as discussed above. Eventually, both words of the corrected updated directory entry are stored within write data pipeline 745, as signified by waveform 810. The particulars of these waveforms are discussed further below.

Whereas waveforms 802 through 810 illustrate various signals associated with reading, updating, and writing directory entries from/to directory 101, waveforms 812 through 818 are indicative of signals associated with reading data from the DIMMs populating data store 103. In particular, waveform 812 illustrates the address and control signals provided on interface 216 by expansion control logic 213 to data store 103. Waveform 816 illustrates data being read from the DIMMs. Recall that each read or write access to data store either reads, or writes, a cache line of data. In the current embodiment, a cache line includes 128 bytes that is read from, or written to, the DIMMs in eight successive transfer operations shown in waveform 816 as transfers D0 through D7 for a given cache line.

When data is read from the DIMMs, it is accompanied by a data strobe generated by data store 103 that is used by data synchronization and error correction logic 605 to synchronize the data to the logic external to the DIMMs. This data strobe is represented by waveform 814. Synchronized and corrected data is provided by expansion control logic onto interface 218 to response out queue 212 on interface 218, as illustrated by waveform 818.

With the foregoing available as an overview, the details of the timing diagrams of FIGS. 8*a* and 8*b* are provided. At time 820, an activation signal for request A is asserted on each of interfaces 216 and 240. These signals serve as the row address strobe, and are provided along with a portion of the request address to the DIMMs of data store 103 and directory 101, respectively. At time 822, read signals are asserted on both interfaces 216 and 240 along with the column portion of the address. These signals allow the cache line for request A to be read from data store 103 at time 824, and further facilitate the retrieval of the associated directory entry from directory 101. The two-word directory entry, including words A0 and A1, is provided to next state logic 220 along with the data strobe, as illustrated in waveforms 806 and 804, respectively. The first word A0 is available at the output of register 710 at time 826, and is thereafter available at the output of write data pipeline 745 at time 828.

Turning next to FIG. 8*b*, waveform 810 illustrates the subsequent storing of the second word A1 of request A within the write data pipeline at time 829. The storing of words A0 and A1 within directory 101 is initiated at time 830 of waveform 806.

Returning to FIG. 8*a*, at time 824 when the two-word directory entry for request A is being read from directory 101, the first words of the cache line for request A is read from data store 103. At time 832, a pre-charge signal is asserted on interface 216 to complete the read operation for this cache line, as shown by waveform 812. The cache line data is read from data store 103 during eight successive transfer operations shown as D0 through D7, respectively, in waveform 816. This data is provided on lines 217 to expansion control logic 213 along with a data strobe represented by waveform 814. The data is corrected, resynchronized, and becomes available at time 833 on interface 218, as shown in waveform 818.

At time 834, and before the data for request A is read from data store 103, expansion control logic 213 asserts an activate signal and the row address for request B on interface 240 to the directory, as shown in waveform 802. At time 235, a similar signal is provided on interface 216 to data store 103. These signals initiate the read operation of the cache line and associated directory entry for request B. These read operations are completed in a manner similar to that described above for request A, with the corrected data for request B becoming available at time 836 on interface 218. The updated directory entry including words B0 and B1 becomes available within write data pipeline at time 838 (FIG. 8*b*), as indicated by waveform 810. Shortly thereafter, these words are stored to the directory, as illustrated by waveform 806 in FIG. 8*b*.

Assuming four requests A through D are included in the set, the foregoing is repeated for each of the requests. The updated directory entry for request D, including words D0 and D1, becomes available within write data pipeline at time 840, and is written back to directory 101 at time 841. Shortly thereafter, at time 842 of waveform 818, the first transfer operation D0 for the cache line of request D is available on interface 218. The directory operations are therefore completed sometime before the availability of the cache line data, making the directory references completely transparent. This is due largely to the fact that only a single settling time is required on interface 221 during time period 844 of waveform 806 when the DIMMs of directory 101 discontinue, and transceivers 700 and 706 of next state logic 220 begin, driving interface 221. Moreover, this is accomplished without employing customized logic in data store 103 or directory 101.

As discussed above, FIGS. 8*a* and 8*b* illustrate the timing associated with four successive read operations. Similar timing is associated with any four operations, which may include all write operations, or may be read operations mixed with write operations. In any case, the directory operations are completed prior to the data operations.

Although the timing details of an exemplary embodiment are shown in FIG. 8, other embodiments employing other timing relationships are contemplated within the scope of the current invention. For example, the current embodiment allows a request to be initiated to data store 103 before a previously issued request in the same set has been completed. This is a result of the use of multiple independently addressable banks and expansions within data store 103 and directory 101. In an alternative embodiment that does not employ multiple independently addressable address ranges of this nature, successive transfer operations to memory must occur in a more serial manner such that each request is completed prior to the initiation of a subsequent request. This alternative embodiment will result in diminished overall throughput.

Further, although the exemplary embodiment includes up to four requests within a single set, the invention contemplates the use of more or fewer requests within a set. Still another embodiment may require that each set always include the maximum number of requests. For example, the system may require that a predetermined number of requests are issued to data store before updated directory entries are returned to the directory. In this embodiment, the bi-directional interface to the directory does not change direction until the predetermined number of requests is added to the set. This latter embodiment has the disadvantage of imposing additional latency if requests that are eligible for addition to the set are not received in TTQ for an extended period of time.

Figure 9:
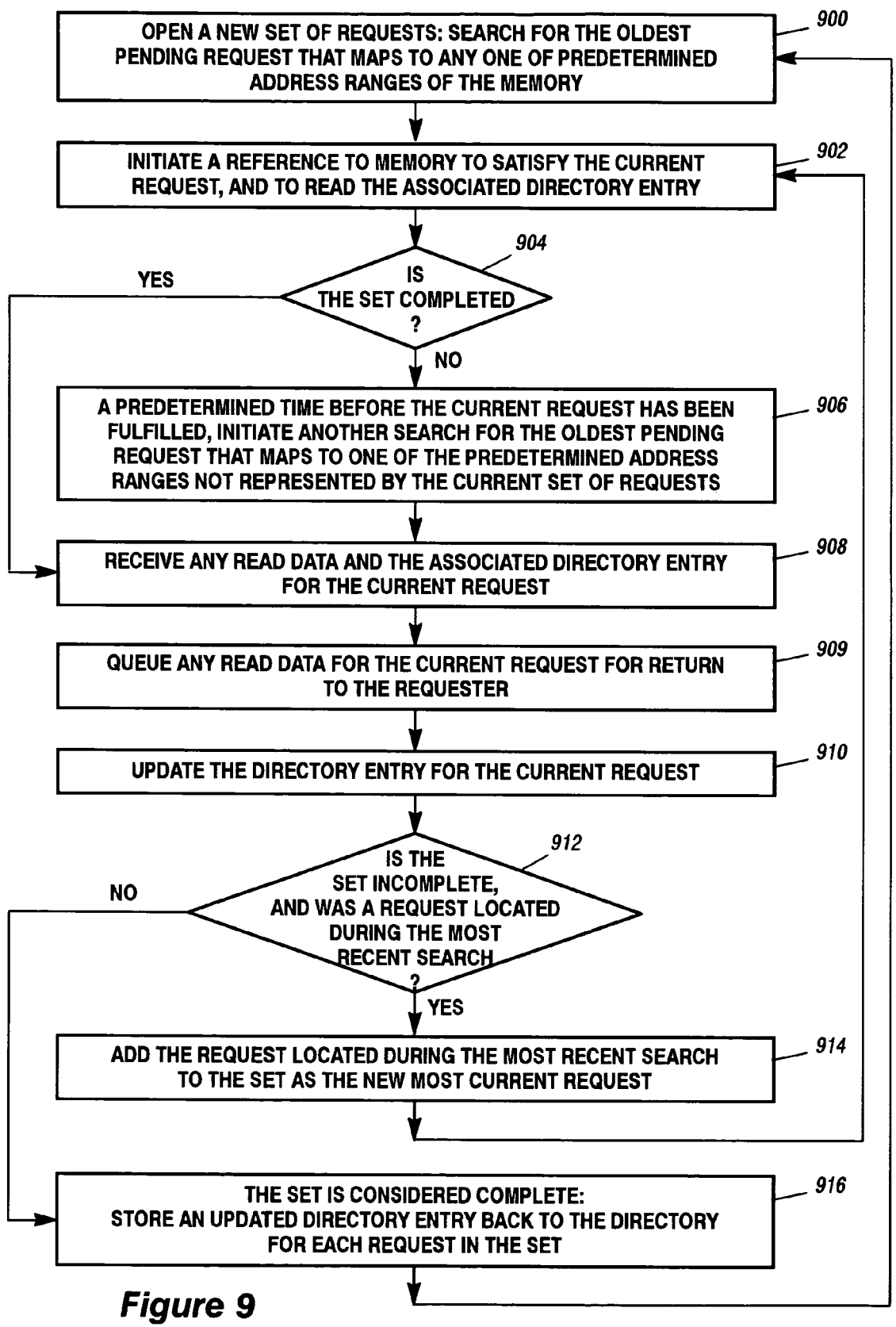
FIG. 9 is a flow diagram illustrating one embodiment of a method according to the current invention.

FIG. 9 is a flow diagram illustrating one embodiment of a method according to the current invention. A new set of requests is opened by searching TTQ 204 for the oldest pending request that maps to any one of multiple predetermined address ranges of the memory (900). In the current embodiment, a range of memory coincides with a bank of an expansion. Four such banks are included within each expansion of data store 103, although other embodiments may include more or fewer banks. In other embodiments, the independently addressable memory ranges may be implemented using some other mechanism other than memory banks of expansions.

A reference to memory is initiated for the current request (902). This reference may read data from, or write data to, the memory. Additionally, an associated directory entry is read from the directory.

Next, it is determined whether the current set has been completed (904). If so, processing continues with step 908.

Otherwise, some predetermined time before the current request has been completed, another search is initiated for the oldest pending request that maps to one of the predetermined address ranges that is not represented by the current set of requests (906). In the current embodiment, this involves locating a request that maps to a bank of directory 101 for which a request has not yet been initiated during the processing of the current set. In the mean time, any read data associated with the current request is received along with the directory entry for that request (908). Any received read data is queued for return to the requester that initiated the request (909). Further, the directory entry for the current request is updated to reflect the state, and location, of the data that is associated with the current request (910).

If the set was determined to be incomplete in step 904 and another request was located during step 906 (912), the newly located request is added to the set and is made the new current request (914), and the process continues with step 902. Otherwise, the set is considered complete, and the updated directory entries for each request in the set are stored back to the directory (916). The process continues with step 900 and the creation of a new set.

It may be appreciated from the timing diagrams of FIGS. 8a and 8b that multiple ones of the steps shown in FIG. 9 may occur within the same time frame. For example, in one embodiment, a reference to memory is being initiated for a next request at the same time any read data and the associated directory entry for a previous request is being received from the memory and directory, respectively. Further, the initiation of the next request continues while the data for the previous request is being queued for return to the requester, and the directory entry for the previous request is being updated. Therefore, it will be understood that the ordering of the steps of FIG. 9 is not intended to depict a strict time relationship between the various activities, but is merely intended to illustrate the logical steps of one embodiment of the inventive process. Moreover, the timing relationships of the steps need not occur as shown in the timing diagrams of FIGS. 8a and 8b, which represents only one exemplary embodiment of the invention.

Various implementations and embodiments of the invention have been described. Nevertheless, it is understood that various modifications can be made without departing from the invention. Accordingly, these and other embodiments are within the scope of the following claims.

What is claimed is:

1. A storage system, comprising:
   a data storage device to store data signals;
   a directory device to store directory entries, each describing the state of respective ones of the data signals;
   expansion control logic coupled to the data storage device and the directory device to submit a set of multiple requests to the data storage device, each request to reference addressed ones of the data signals; and
   next state logic coupled to the directory device to read, and to update, multiple directory entries, each directory entry describing the state of data signals referenced by a different one of the requests, and after reading all of the multiple directory entries has occurred, to initiate writing each of the updated directory entries back to the directory device in succession.

2. The system of claim 1, wherein the data storage device includes independently addressable memory ranges, and wherein the expansion control logic includes a compare circuit to select the requests in the set such that each request in the set addresses a different one of the addressable memory ranges.

3. The system of claim 1, wherein the expansion control logic includes control logic to select a request to add to the set, the request being selected a predetermined period of time before a reference to the data storage device has been completed for a different request in the set.

4. The system of claim 3, wherein the control logic includes a circuit to allow the set of requests to be considered complete if a pending request is not available for addition to the set.

5. The system of claim 2, wherein the expansion control logic further includes a priority circuit to select for addition to the set the requests that have been pending the longest.

6. The system of claim 1, wherein the expansion control logic includes a control circuit to initiate a request to the data storage device before a previously initiated request has been completed.

7. The system of claim 6, and further including at least one timer circuit coupled to the control circuit to control submission of requests according to the timing requirements of the data storage device.

8. The system of claim 7, and further including at least one additional timer circuit coupled to the control circuit to control reading of a directory entry from, and writing of a directory entry to, the directory device according to the timing requirements of the directory device.

9. The system of claim 8, wherein the control circuit includes programmable logic to allow at least one of the timing requirements of the data storage device and the timing requirements of the directory device to be programmably selected.

10. The system of claim 1, wherein the next state logic includes state logic to update each of the multiple directory entries based on the identity of a requester that requested the data signals described by the directory entry, a request type, and a previous state of the described data signals.

11. For use with a data storage system to store data signals and a directory to store state information describing respective ones of the data signals, wherein the data storage system including multiple independently addressable storage devices, a method of handling requests to access addressed ones of the data signals, comprising:
   creating a set of requests, each request in the set addressing a different one of the storage devices;
   issuing the requests in the set to the data storage system;
   for each of the requests in the set, reading from the directory the state information describing the addressed data signals and updating the state information to reflect the next state of the addressed data signals; and
   after the state information for all requests in the set have been read from the directory, storing the updated state information for all requests in the set to the directory.

12. For use with a data storage system to store data signals and a directory to store state information describing respective ones of the data signals, wherein the data storage system including multiple independently addressable storage devices, a method of handling requests to access addressed ones of the data signals, comprising:
   creating a set of requests, each request in the set addressing a different one of the storage devices;
   issuing the requests in the set to the data storage system;
   for each of the requests in the set, reading from the directory the state information describing the addressed data signals and updating the state information to reflect the next state of the addressed data signals;
   after the state information for each request in the set has been read from the directory, storing the updated state information for each request in the set to the directory; and wherein the creating step includes:
a.) selecting from one or more pending requests to obtain a current request that is added to the set; and
b.) after the current request has been issued to the data storage system but before the current request has been completed by the data storage system, selecting another request to add to the set, the other request becoming the current request.

13. The method of claim 12, wherein the directory includes multiple independently addressable directory storage devices, each being associated with one or more different ones of the multiple storage devices in the data storage system, and wherein the creating step includes selecting the set of requests so that each request in the set addresses data signals stored in a storage device that is associated with a different one of the directory storage devices.

14. The method of claim 12, and further including repeating step b.) until the set includes a predetermined number of requests, or until no pending request is available that is eligible for addition to the set.

15. The method of claim 14, wherein step a.) includes selecting a request that has been pending to the data storage system the longest.

16. The method of claim 15, wherein step b.) includes selecting the request that has been pending to the data storage system the longest, and that does not address one of the storage devices already addressed by the requests included in the set.

17. The method of claim 16, and wherein if an eligible request is not available for addition to the set within a predetermined time prior to the completion of the current request, the set is considered complete, and no additional request will be included in the set.

18. The method of claim 17, wherein the directory includes multiple independently addressable directory storage devices, each being associated with one or more different ones of the multiple storage devices in the data storage system, and wherein step b.) includes selecting the request that has been pending the longest and that requests access to a storage device that is associated with a directory storage device that does not store state information for data signals addressed by any other request in the set.

19. The method of claim 12, wherein the state information is read from the directory according to programmably selectable timing constraints that describe circuitry included within the directory.

20. For use with a system that includes a data storage system to store data signals and a directory to store directory entries for the data signals, a method of handling requests that are pending to the data storage system, comprising:
issuing multiple selected ones of the pending requests to the data storage system;
for each issued request, retrieving from the directory, and updating, a directory entry addressed by the request; and
after all directory entries addressed by the selected requests are retrieved, initiating the storing of all retrieved directory entries back to the directory.

21. The method of claim 20, and further including, for each issued request, initiating multiple data transfer operations to, or from, the data storage system.

22. The method of claim 20, and further including issuing a selected request before a previously issued selected request has been completed by the data storage system.

23. The system of claim 20, wherein the data storage system includes multiple storage devices, and further including selecting the selected ones of the pending requests so that each selected request addresses a different one of the multiple storage devices.

24. The system of claim 21, wherein the data storage system includes multiple storage devices that are organized into predetermined groups, and further including selecting the selected ones of the pending requests so that each selected request addresses a storage device included within a different one of the groups.

25. The system of claim 24, wherein each of the multiple storage devices is assigned a bank number, and wherein the predetermined groups are created according to the bank number.

26. The system of claim 24, and wherein the set of requests includes up to a predetermined maximum number of requests that is based on the number of groups.

27. A data processing system, comprising:
at least one requester to issue requests; and
a storage system coupled to the at least one requester, the storage system including:
a data device to store data signals requested by the requests;
a directory to record directory entries, each describing respective ones of the data signals;
a request queue to store requests pending to the data device;
an expansion control circuit coupled to the request queue to select multiple ones of the pending requests for issuing to the data device, the expansion control circuit to initiate retrieval of a respective directory entry for each of the selected requests, and after retrieval of all directory entries for the selected requests, to initiate storing of updated copies of the retrieved directory entries to the directory.

28. A storage system, comprising:
data storage means for storing data signals;
directory means for storing directory entries;
port means for receiving requests, each request addressing data signals stored within the data storage means and further addressing a respective directory entry in the directory means; and
expansion control means for selecting a set of the received requests,
for issuing the set of requests to the data storage means for processing,
for initiating retrieval of all directory entries addressed by the set of requests so that the directory entries may be updated, and
following retrieval of all directory entries addressed by the set of requests, for initiating the storing of all retrieved directory entries to the directory.

29. The system of claim 28, and further including next state means for updating the retrieved directory entries based, at least in part, on information included in the requests of the set.

30. The system of claim 29, wherein the next state means further includes means for updating the retrieved directory entries based on information included within the directory entries.

31. The system of claim 28, wherein the expansion control means includes means for issuing a request of the set to the data storage means prior to the time processing has completed for a previously issued request of the set.

32. The system of claim 28, wherein the data storage means includes multiple independently addressable address ranges, and further including compare means for selecting the set of requests so that each request in the set addresses data signals stored within a different one of the addressable address ranges.

33. The system of claim 28, wherein the directory means includes multiple independently addressable address ranges, and further including compare means for selecting the set of requests so that each request in the set addresses a directory entry stored within a different one of the addressable address ranges of the directory.

34. The system of claim 28, and further including priority means for selecting the requests in the set based on the length of time the requests have been pending.

35. The system of claim 28, and further including programmable state means for controlling the issuing of the requests to the data storage means based on programmable timing data indicating timing requirements of the data storage means.

* * * * *